United States Patent
Khoyi et al.

(10) Patent No.: US 9,813,381 B2
(45) Date of Patent: Nov. 7, 2017

(54) FLEXIBLE AND SECURE TRANSFORMATION OF DATA USING STREAM PIPES

(71) Applicant: Open Text SA ULC, Halifax (CA)

(72) Inventors: Dana Lawrence Khoyi, Westford, MA (US); John Martin Pratt, Atkinson, NH (US); John Patino-Bueno, Hudson, NH (US)

(73) Assignee: Open Text SA ULC, Halifax, CA (US)

( * ) Notice: Subject to any disclaimer, the term of this patent is extended or adjusted under 35 U.S.C. 154(b) by 40 days.

(21) Appl. No.: 14/701,967

(22) Filed: May 1, 2015

(65) Prior Publication Data

US 2015/0372807 A1 Dec. 24, 2015

Related U.S. Application Data

(60) Provisional application No. 62/013,809, filed on Jun. 18, 2014.

(51) Int. Cl.
*H04L 29/06* (2006.01)
*G06F 21/60* (2013.01)
*G06F 17/30* (2006.01)

(52) U.S. Cl.
CPC ........ *H04L 63/04* (2013.01); *G06F 17/30076* (2013.01); *G06F 21/602* (2013.01); *G06F 21/606* (2013.01); *G06F 2221/2107* (2013.01)

(58) Field of Classification Search
CPC .............................. H04L 63/04; G06F 21/602
USPC ....................................................... 713/150
See application file for complete search history.

(56) References Cited

U.S. PATENT DOCUMENTS

| | | | | |
|---|---|---|---|---|
| 6,208,990 | B1* | 3/2001 | Suresh | G06F 17/30563 |
| 7,107,199 | B2* | 9/2006 | Schreiber | G06F 17/5045 |
| | | | | 703/13 |
| 7,484,079 | B2* | 1/2009 | Gupta | G06F 9/3869 |
| | | | | 712/220 |
| 7,903,117 | B2* | 3/2011 | Howell | G06T 1/00 |
| | | | | 345/501 |
| 2004/0098498 | A1* | 5/2004 | Mitra | G06F 17/30067 |
| | | | | 709/231 |
| 2004/0107356 | A1* | 6/2004 | Shamoon | H04L 63/0428 |
| | | | | 713/193 |
| 2009/0097567 | A1* | 4/2009 | Shigeta | H04N 19/176 |
| | | | | 375/240.24 |
| 2012/0079175 | A1* | 3/2012 | Flynn | G11C 7/1012 |
| | | | | 711/103 |

(Continued)

*Primary Examiner* — Dede Zecher
*Assistant Examiner* — Dereena Cattungal
(74) *Attorney, Agent, or Firm* — Sprinkle IP Law Group

(57) ABSTRACT

Responsive to a request to retrieve or store a file, a transformation pipeline may be created to efficiently transform file data one unit at a time in memory. The transformation pipeline includes a sequence of transformation streams, each containing a write method, a read method, and a transformation to be applied. The write method moves a unit of data, for instance, from a memory buffer into an associated stream. The read method reads the unit of data from the stream, calls an associated transformation, and passes the unit of data thus transformed to the next stream or a destination. This process is repeated until all desired and/or required transformations such as compression, encryption, tamper protection, conversion, etc. are applied to the unit of data.

17 Claims, 5 Drawing Sheets

(56) References Cited

U.S. PATENT DOCUMENTS

| | | | |
|---|---|---|---|
| 2012/0144053 A1* | 6/2012 | Futty | H04L 65/4084 |
| | | | 709/231 |
| 2014/0169693 A1* | 6/2014 | Kuo | H04N 19/174 |
| | | | 382/248 |
| 2015/0277965 A1* | 10/2015 | Bradshaw | G06F 9/466 |
| | | | 718/101 |
| 2016/0086298 A1* | 3/2016 | Holland | G06T 1/20 |
| | | | 345/506 |
| 2016/0314155 A1* | 10/2016 | Wilson | G06F 17/30336 |

\* cited by examiner

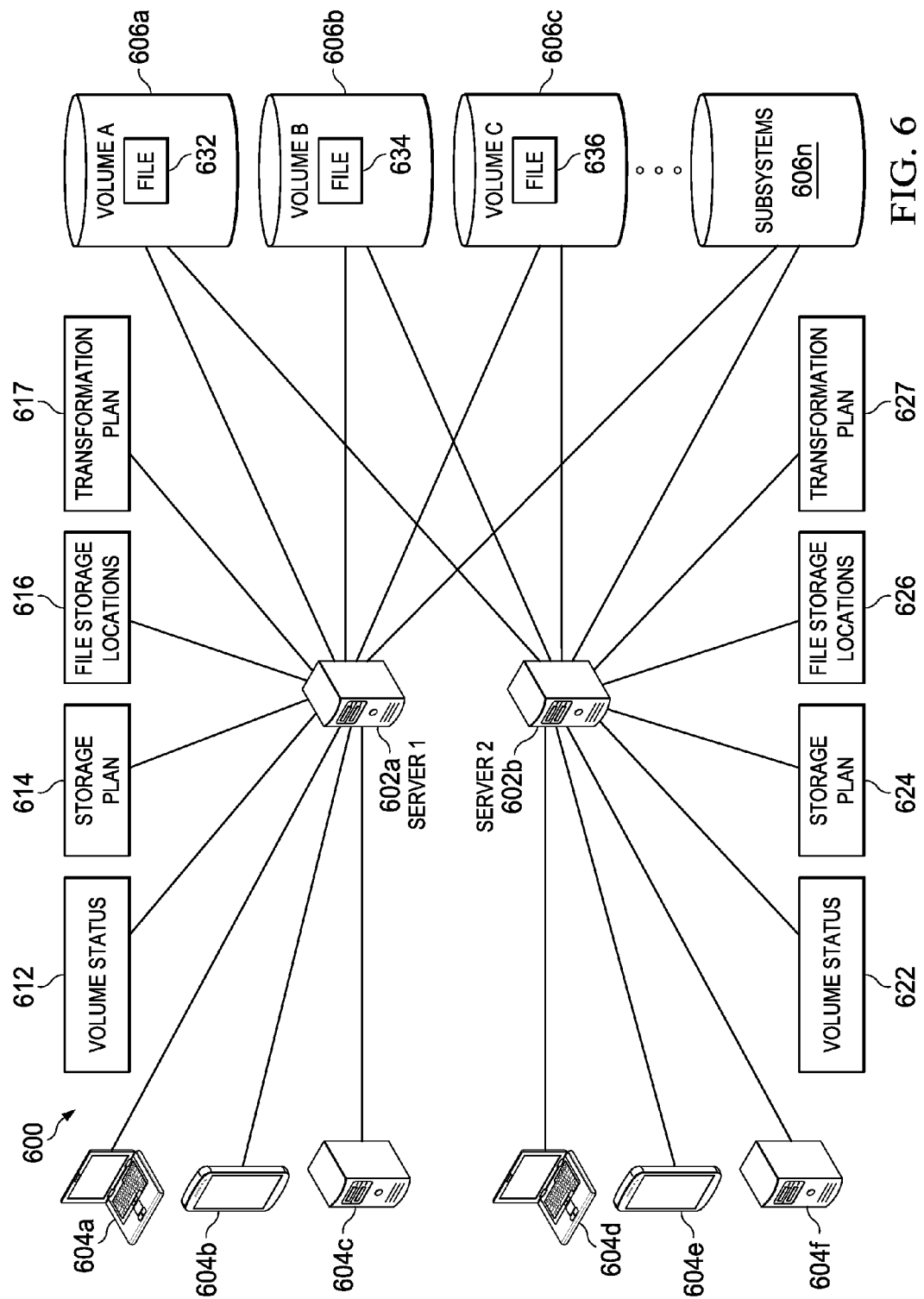

FLEXIBLE AND SECURE TRANSFORMATION OF DATA USING STREAM PIPES

CROSS-REFERENCE TO RELATED APPLICATION(S)

This is a conversion of, and claims a benefit of priority under 35 U.S.C. §119(e)(1) from U.S. Provisional Application No. 62/013,809, filed 18 Jun. 2014, entitled "SYSTEM AND METHOD FOR SECURE TRANSFORMATIONS OF FILES USING STREAM PIPES," which is fully incorporated herein by reference.

TECHNICAL FIELD

This disclosure generally relates to systems and methods for transformation of files. More particularly, the disclosure relates to systems and methods for transformations of data files using stream pipes. More particularly, the disclosure relates to systems and methods that provide flexible and secure transformations of streamed data without requiring streamed data to be written to interim persistent storage.

BACKGROUND OF RELATED ART

An increasing amount of data is stored and communicated in electronic format. In many cases, data may exist only in electronic form, making access and security considerations for such data important—inasmuch as the data may not be readily accessed or protected in any other manner.

Combined human activity creates two-and-a-half quintillion (2.5E18) bytes of electronic data every day. 90% of all electronic data has been created in just the last two years. Data sets are rapidly growing in size due, at least in part, to numerous inexpensive information-sensing devices, cameras, microphones, radio-frequency identification (RFID) readers, wireless sensor networks, and the like. At the same time, there has been a dramatic increase in posts to social media, digital pictures and videos, business documents, software logging, and the like.

Concurrent with the growth of newly generated data, the world's per-capita capacity to store digital information has doubled every 40 months since the 1980s. Developed economies increasingly make use of data-intensive technologies. There are 4.6 billion mobile-phone subscriptions worldwide and 1.5 billion people accessing the Internet. Between 1990 and 2005, more than 1 billion people worldwide entered the middle class, which means there will be increased data growth as more people become more educated and more engaged with information technologies.

The world's total effective capacity to communicate information through information networks was 281 petabytes in 1986, 471 petabytes in 1993, 2.2 exabytes in 2000, and 65 exabytes in 2007. It is predicted that the amount of data traffic communicated over the Internet on an annual basis will exceed 667 exabytes after 2014. Approximately one third of total stored data is in the form of alphanumeric text and still image data, which are the preferred data formats for most user applications.

In view of the growth trend toward increasingly large and complex data sets, conventional data management and data processing systems and methods are strained and, in some cases, unequal to the task. Challenges include analysis, capture, curation, search, sharing, security, storage, transfer, visualization, and information privacy. Electronic data can be described as generally having the following characteristics:

Volume: The quantity of data generated is important. The size of a data set can determine the value and potential utility of the subject data.

Variety: The category to which data belongs is a factor that helps people who are using the data and are associated with it to employ data to their advantage.

Velocity: The speed of generation of new data or how fast the data is generated and processed to meet the demands and challenges of growth and development.

Variability: The inconsistency that can be shown within the data, thus impairing effective management and use the data.

Veracity: The quality and precision of the data being captured can vary greatly. Accurate analysis depends on accuracy of the source data.

Complexity: Management (or even awareness) of intrinsic value or correlations within a data set can become a difficult issue to address, especially when large volumes of data come from multiple sources.

Problems posed by the growth trend toward increasingly large and complex data sets are not going away and will only become greater in the future. A challenge for large enterprises is determining how to implement data initiatives that straddle an entire organization while optimizing the above-described characteristics and other data management, data processing, and data communication considerations.

SUMMARY OF DISCLOSURE

Transformation of data using stream pipes is generally disclosed. File data may be transformed using a series of transformation streams grouped together to form a transformation pipeline. Representative exemplary embodiments do not write data units processed in the transformation pipeline, or in any component transformation stream embodied therein, to persistent storage at any point intermediately disposed between the transformation pipeline's input and transformed output. Transformed data units are not written to persistent storage at any point intermediately disposed within the transformation pipeline.

Representative disclosed embodiments generally provide systems and methods for transforming streamed data in memory. Other representatively disclosed embodiments generally relate to systems and methods that provide compression, encryption, and/or tamper detection transformation(s) of streamed data in place. Other representatively disclosed embodiments generally relate to systems and methods that provide transformation(s) of streamed data without requiring that the streamed data or transformed data be written to interim persistent storage.

A representative method for streamed transformation of data employs a file server configured to receive a request from a client device to read/write a file. Metadata associated with the file and/or transformation plan information is used to create a transformation pipeline having a sequence of transformation streams corresponding to a set of transformations to be applied to the file. The file server receives file data from a source device, buffers the data, and segments the data into units of file data. These units of file data are transformed as they pass through the transformation pipeline. File data units pass through each transformation stream of the transformation pipeline in sequence where individual transformations are applied. The process is repeated for additional file data units until the file has been completely read/written or a termination condition is satisfied (e.g., failure of a data unit's hash to canonically reference a known, previously stored intermediate or cumulative hash).

A representative embodiment comprises a system having a processor and non-transitory computer memory including instructions translatable by the processor to perform a method substantially as described herein. Another representative embodiment comprises a computer program product having at least one non-transitory computer-readable storage medium storing instructions translatable by at least one processor to perform a method substantially as described herein.

Numerous other embodiments are also possible.

These, and other, aspects of the disclosure will be better appreciated and understood when considered in conjunction with the following description and the accompanying drawings. It should be understood, however, that the following description, while indicating various embodiments of the disclosure and specific details thereof, is given by way of illustration and not of limitation. Many substitutions, modifications, additions or rearrangements may be made within the scope of the disclosure without departing from the spirit thereof, and the disclosure includes all such substitutions, modifications, additions, or rearrangements.

BRIEF DESCRIPTION OF DRAWINGS

The drawings accompanying and forming part of this specification are included to representatively depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components throughout. Note that the features illustrated in the drawings are not necessarily drawn to scale.

FIG. 6 is a diagrammatic representation of another embodiment of a distributed computer system.

DETAILED DESCRIPTION

Systems and methods of data storage and various features and advantageous details thereof are explained more fully with reference to the non-limiting embodiments that are representatively illustrated in the accompanying drawings and detailed in the following description. Descriptions of well-known starting materials, processing techniques, components and equipment are omitted so as not to unnecessarily obscure the invention in detail. It should be understood, however, that the detailed description and specific examples, while indicating exemplary and representative embodiments of the invention, are given by way of illustration only and not by way of limitation. Various substitutions, modifications, additions or rearrangements are within the spirit or scope of this disclosure and will become apparent to those skilled in the art from this disclosure.

Representative embodiments described herein provide systems and methods for flexible, high-performance, and secure transformations of data files.

Figure 1:
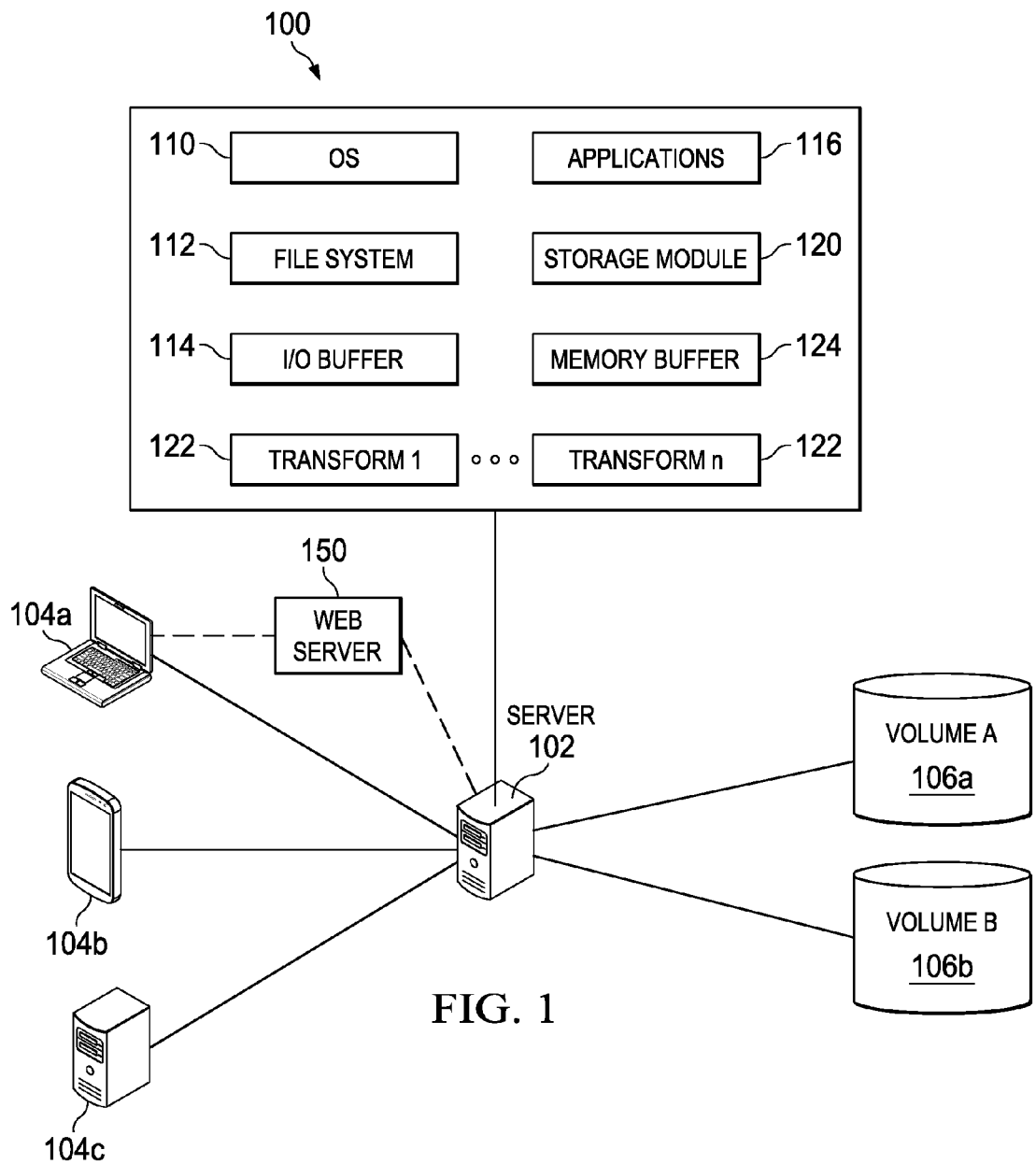
FIG. 1 is a diagrammatic representation of one embodiment of a distributed computer system.

FIG. 1 is a diagrammatic representation of a distributed computer system 100 comprising a server 102 that receives and processes requests from client computing devices 104 (104a, 104b, 104c) (e.g., mobile devices, laptop computers, desktop computers, servers, or other computing device). In some embodiments, server 102 may include one or more server machines. Server 102 may be configured to access storage volumes 106 (e.g., Volume A 106a and Volume B 106b). Server 102 may be communicably coupled with web server 150 to receive and process requests from client computing devices (e.g., laptop computer 104a) to server 102 through web server 150. Alternatively, conjunctively or sequentially, in other representative embodiments, server 102 may itself comprise an integrated web server module (not shown in FIG. 1) for receiving and processing requests from client computing devices through the web server module. In some embodiments, server 102 may embody a content management system configured for managing content residing in storage volumes 106 (e.g., Volume A 106a and Volume B 106b).

Storage volumes 106 may comprise a variety of storage types including, but not limited to, local drives, network file server volumes, cloud-based storage volumes, storage area network (SAN) storage, database storage, or other storage. Server 102 may be suitably adapted to maintain information used to, for example, connect to and interact with storage volumes 106 to which server 102 has access.

Server 102 can execute a number of software applications and modules including, but not limited to an operating system (OS) 110 that provides a local file system 112. Server 102 may further include I/O buffer 114 for controlling reading to and writing from memory buffers 124. In some embodiments, I/O buffer 114 may be a I/O buffer management process provided by the operating system 110 or other code. Server 102 may further include user, server, or other applications (e.g., applications 116). Storage module 120 can manage reading files from and storing files to storage volumes 106. Storage module 120 may execute a number of transformations 122 when reading files from or writing files to storage volumes 106.

In response to a request to read/retrieve or write/store a file, storage module 120 may establish a transformation pipeline comprising a sequence of transformation streams to perform one or more transformations 122. In representative exemplary embodiments, the sequence of transformations applied may depend on metadata associated with a file or other information (e.g., a transformation plan associated with a particular file or file type). Thus, the sequence of transformations applied to a first file may be different than the sequence of transformations applied to a second or subsequent file.

For the purposes used herein, the term "transformation," and contextual variants thereof, generally refer to a process of taking data received as input and operating on the data (e.g., by applying one or more specific functions to the data to change the underlying structure, representation, and/or interpretation of the data, etc.) to produce output data. Typically, the output data is generally modified in some way relative to and compared with the input data.

In various representative embodiments, it may be desirable for transformed output data to preserve substantially all of the content of data received as input prior to transformation. In such cases, the transformation would be understood as corresponding to a unitary transformation, where the original input data could be recovered by employing the inverse operation of the transformation on the output data. For example, a decompression operation (i.e., the inverse operation of a compression transformation) may be employed to recover uncompressed data from a compressed file. By way of further example, a de-encryption operation (i.e., the inverse operation of an encryption transformation) may be employed to recover unencrypted input data from an encrypted file.

In various representative embodiments where data received as input for subsequent transformation is furnished as compressed data, transformation of the data to produce uncompressed output data may comprise a decompression transformation.

In various representative embodiments where data received as input for subsequent transformation is furnished as encrypted data, transformation of the data to produce unencrypted output data may comprise a decryption transformation.

In various representative embodiments where data received as input for subsequent transformation is intended to produce compressed output data, transformation of the data may comprise a compression transformation.

In various representative embodiments where data received as input for subsequent transformation is intended to produce encrypted output data, transformation of the data may comprise an encryption transformation.

In various representative embodiments, a transformation may correspond to a non-unitary transformation, where the original input data may not be recovered by employing an inverse operation of the transformation on the output data. For example, a hashing operation would produce the hash value as output, but there is no inverse operation for hashing that will return the original input data from the hash output alone.

In various representative embodiments, a transformation may correspond to an identity operation, where the output of the transformation is identical to the original input data. For example, a copy operation would produce the original input data as output.

In various representative embodiments, a transformation may correspond to two or more transformation operations. For example, a transformation may comprise a hashing operation and a copy operation (e.g., since the output of the non-unitary transformation of the hashing operation cannot be reversed to recover the original input data, the copy operation could be implemented in parallel with the hashing operation to pass a copy of the data for subsequent processing or storage).

As used herein, a data "stream" refers to one or more coherent data paths used to transmit or receive information in the process of being transmitted. Each data processing operation in a grouping of processing operations may form (and occupy a discrete position in) what may be termed a data transformation "pipeline." The transformation pipeline provides a processing sequence and traffic path for streamed data. Any discrete segmentation (e.g., corresponding to a discrete data processing operation, as in the case of, e.g., "compression transformation," or "hashing") or arbitrary segmentation (i.e., referencing generic pipeline ontology, as in the case of, e.g., "after the data is encrypted," or "before the data is written to storage") of the data pipeline may be referred to as a data stream in the data pipeline. Accordingly, individual transformations in (and forming) a transformation pipeline may be understood to constitute and be associated with their own data streams (i.e., the individual transformations in the transformation pipeline comprise their own transformation streams).

Figure 2:
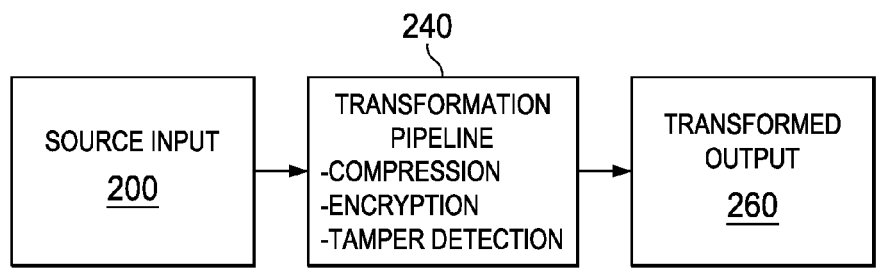
FIG. 2 is a diagrammatic representation of one embodiment of a transformation pipeline.

At a relatively high level of abstraction for various representative embodiments, as generally depicted for example in FIG. 2, source input 200 may provide data to transformation pipeline 240 to produce transformed output 260. Transformation pipeline 240 may comprise a sequence of transformation streams. For example, a compression transformation stream, an encryption transformation stream, and a tamper detection transformation stream may have their individual streams aggregated to form transformation pipeline 240. Source input 200 may comprise a server-side file (e.g., audio file, video file, document file, medical record file, financial record file, business transaction file, etc.) or a file string that is segmented and provided on a unit-by-unit basis to transformation pipeline 240 as input for its component transformation streams (e.g., compression, encryption, tamper detection, etc.) to produce transformed output 260 on a unit-by-unit basis. Referring to FIGS. 1 and 2, examples of a source device for source input 200 may include client computing devices 104 (104a, 104b, 104c) and examples of a destination device for output 260 may include storage volumes 106 (e.g., Volume A 106a and Volume B 106b). Additionally, examples of a source device for source input 200 may include storage volumes 106 (e.g., Volume A 106a and Volume B 106b) and examples of a destination device for output 260 may include client computing devices 104 (104a, 104b, 104c).

In various representative aspects, a "unit" of file data may correspond to, for example, a byte of data presented for processing or transformation. Alternatively, conjunctively, or sequentially, a unit of file data may correspond to a portion of file data that may be larger or smaller than a byte. In some embodiments, all units of data are of the same size. In some embodiments, not all units of data need be the same size. In the context of this disclosure, a unit of file data that is being processed and/or transformed may be referred to as a piece, a segment, a block, a chunk, a token, or the like.

Transformed output 260 may be optionally written to persistent storage subsequent to transformation; however, representative exemplary embodiments do not write data units processed in transformation pipeline 240, or any component transformation stream embodied therein, to persistent storage at any point intermediately disposed between source input 200 and transformed output 260. That is, transformed data units are not written to persistent storage at any point intermediately disposed between source input 200 and transformed output 260.

Referring again to FIG. 1, server 102 may receive a file from a source (for example, client device 104 or storage volume 106) as an input stream, placing units of file data in memory buffer 124. In some embodiments, the complete file is not received and/or stored at server 102 while servicing a request to read or write the file. Each unit of data can be passed along the transformation pipeline so that the appropriate transformations 122 may be applied. After a unit of data has been transformed in a first transformation stream in the transformation pipeline, it can be passed to the next transformation stream in the transformation pipeline and so on. Accordingly, the transformations 122 can be applied sequentially on a unit-by-unit basis. When the transformations 122 are completed, a unit can be passed to an output stream or other process and sent to a destination.

Any number or types of transformations may be applied including, but not limited to, compression, encryption, tamper detection, file format conversions (e.g., *.doc to *.pdf) or any other transformation(s) as needed or desired.

According to one embodiment, an encryption transformation may apply a cryptography operation, such as a symmetric cryptography operation or other cryptography operation, to each file unit. The key(s) used to encrypt/decrypt a file may be stored in separate storage apart from the file in various representative embodiments.

A tamper detection transformation can generate a hash from units of file data. As each unit of file data is processed, the hash for the file may evolve so that a cumulative tamper detection hash for a file as a whole may be created, notwithstanding that the entire file may not have been available for hashing at any discrete moment in time. The cumulative hash may be stored in a tamper digest (e.g., tamper digests 418, 555; shown in FIG. 4 and FIG. 5, respectively), with the file itself, or at another location. Alternatively, conjunctively or sequentially, one or more intermediate hash values may be stored in a tamper digest.

When reading a file from storage volume 106, server 102 may be suitably configured to compare a newly generated hash for the file with a stored hash for the file to determine if the hashes match. A discrepancy between the hashes may indicate that the file has been altered without authorization. Accordingly, server 102 can take a tamper detection action, such as not sending the last unit of the file to client 104 (which may result in an error at client 104), sending an error notification to client 104, locating a copy of the file at another location, or taking another action. More specifically, in some embodiments, in response to determining that the file has been altered without proper authorization (i.e., the hashes do not match), server 102 may cease sending units of the file to client 104, send an error message or notification to client 104, and/or read a good copy of the file from another location and serve the good copy to client 104.

In some cases, a tamper detection transformation may generate a hash that is a hash of a portion (i.e., some but not all) of the file. The intermediate hash may be stored with the file or at another location. When reading a file from storage volume 106, server 102 can compare a newly generated hash for the data file with a stored intermediate hash for the file to determine if the hashes match. A discrepancy between the hashes may indicate that the data file has been altered without authorization. Accordingly, server 102 can take a tamper detection action, such as not sending further units of the file to client 104 (which may result in an error at client 104), sending an error notification to client 104, locating a copy of the file at another location, or taking another action, as explained above.

In various representative embodiments: a compression transformation may compress (or by inverse operation, decompress) a file on a unit-by-unit basis; an encryption transformation can encrypt (or by inverse operation, decrypt) a file on a unit-by-unit basis; or a file format transformation can convert a file from one format to another on a unit-by-unit basis.

It may be appreciated that buffer 124 may be smaller than the file (i.e., buffer 124 may not be able to hold/store all of the file data in memory). Furthermore, a unit of data may be smaller than buffer 124. In various representative embodiments, while a file may be passed through and transformed at server 102, the entire file need not be located at or segmented from server 102 during the process of servicing a request from client 104 to read or write the file. Furthermore, it may be the case that reading or writing a file in response to a client request occurs entirely in volatile memory at server 102 without storing the file to local file system 112.

Figure 3:
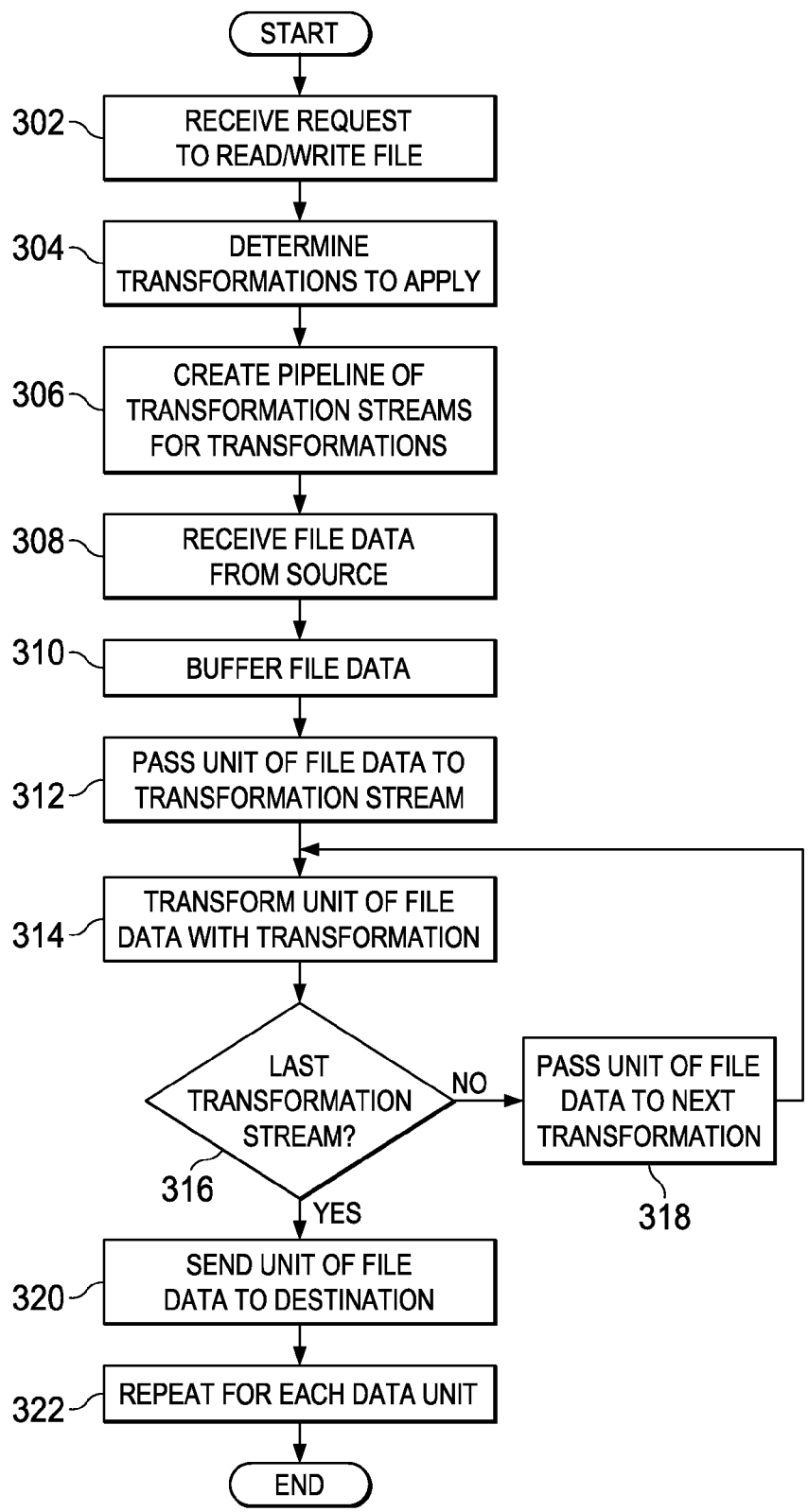
FIG. 3 is a flow chart of one embodiment of a method for providing flexible stream pipe data processing.

FIG. 3 is a flow chart showing one embodiment of a method for providing flexible stream pipe processing. The method of FIG. 3 may be implemented through execution of code at a server (e.g., by a processor of server 102, shown in FIG. 1) or other computing device.

A computing device may be configured to receive a request to read or write file data (step 302) and determine a set of transformations to apply (step 304). As further explained below, a pipeline of transformation streams can be created for the transformations (step 306). File data can be received from a source (step 308) and buffered (step 310) in a memory buffer, such as a volatile memory buffer (e.g., RAM). A unit of file data may be written from the buffer into the first data stream of the transformation pipeline (step 312) and the corresponding transformation performed (step 314). If there is a subsequent transformation stream in the transformation pipeline (as determined, for example, at step 316), the unit of file data can be passed to the next transformation stream (step 318) and the next corresponding transformation performed (step 314). When the unit of file data has been processed by the last transformation in the transformation pipeline (as determined, for example, at step 316), the unit of file data can be sent to a destination process or device (step 320). These steps may be repeated (step 322) for each unit of file data until the entire file has been processed, an error is encountered, or other condition is met.

In various representative embodiments for some computing devices, a transformation pipeline can be established on a per request basis. Furthermore, there may be, in some embodiments, a thread provisioned per request with each request routing through its own pipeline. For a server (e.g., server 102, server 502, server 602, or other server) receiving requests from multiple clients, hundreds or thousands of requests may be processed with near simultaneity with each request routing through its own transformation pipeline.

When the transformation pipeline is established, write class methods (see, e.g., ".Write" in FIG. 4) can be instantiated to move data from a buffer into a stream (or from stream to stream) in the transformation pipeline, and read class methods (see, e.g., ".Read" in FIG. 4) can be instantiated to process transformation of the file data units. In an embodiment, there can be a buffer between streams.

As an example, in one embodiment, multiple stream classes can be aggregated or bundled (e.g., conjunctively engaged or otherwise arranged in a sequence) to build a logical stream pipe (referred to herein as a transformation pipeline) that allows read or write methods to be called on each stream such that the results of each read operation from each stream class is passed as input to the next stream class in the transformation pipeline. To this end, creating a transformation pipeline may include instantiating a stream object for each stream class of the multiple stream classes. The instantiated stream objects may have a common base object class. Each stream object may include a write method for moving a unit of data into the associated stream and a read method for retrieving the unit of data from the associated stream, calling an associated transformation function (e.g., compression, encryption, tamper protection, conversion, encoding, transcoding, etc.), and providing the unit of data thus transformed within the associated stream to the next stream or, if no more transformation streams in the transformation pipeline, to a destination device.

Figure 4:
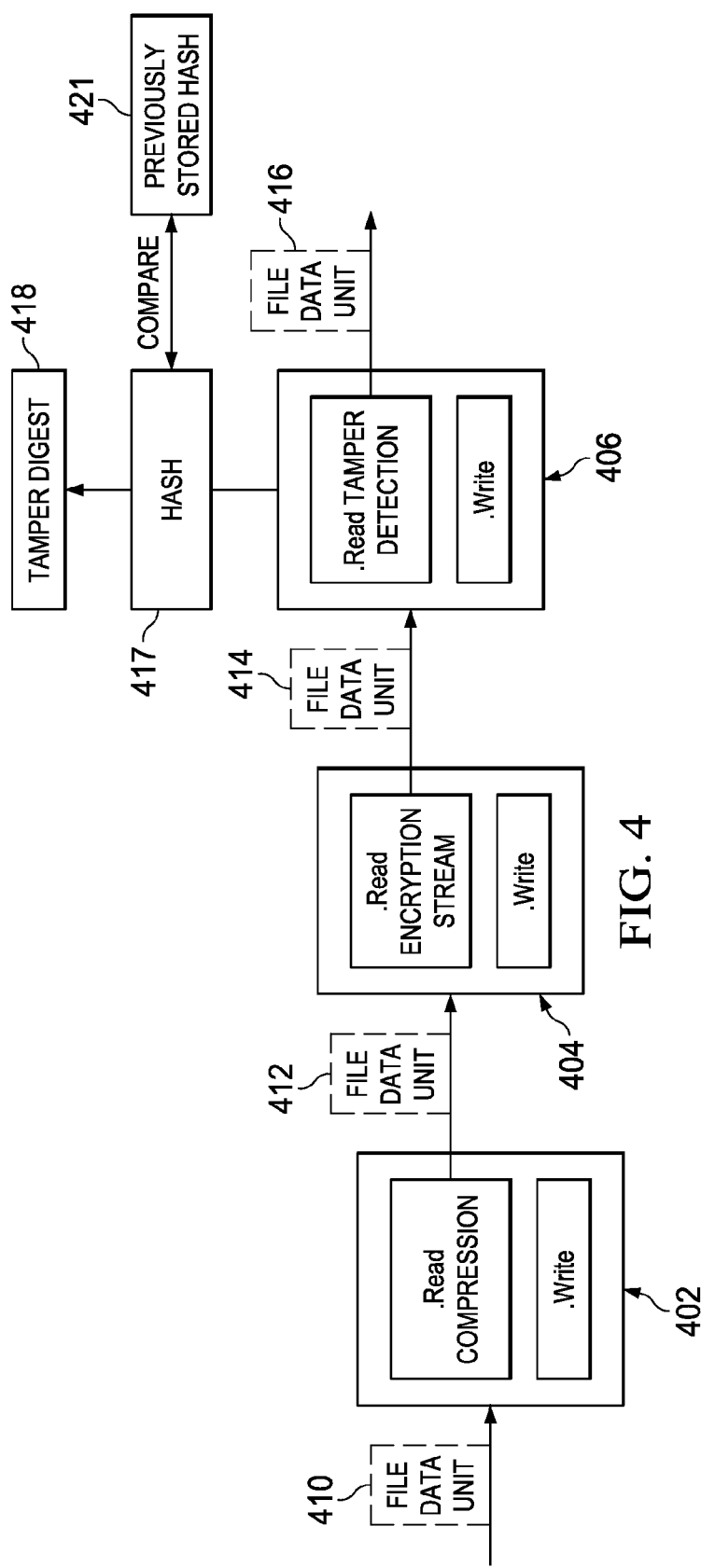
FIG. 4 is a diagrammatic representation of another embodiment of a transformation pipeline.

FIG. 4 is a diagrammatic representation of a representative embodiment of a transformation pipeline comprising a sequence of streams (e.g., compression 402, encryption 404, and tamper detection 406), each having read and write class methods. In representative embodiments, a read class method retrieves a data unit from a buffer (or the previous stream in the transformation pipeline), calls an associated transformation operation to perform a particular transformation on the unit of data, and provides the unit of data thus transformed to the next transformation stream in the transformation pipeline.

In the representative example generally depicted in FIG. 4, a sequence of streams for writing a file to a storage volume includes a compression stream 402, an encryption stream 404, and a tamper detection stream 406.

File data unit 410 (e.g., in a buffer) is provided to compression stream 402. In representative embodiments: the read method of compression stream 402 performs a compression transformation to create compressed file data unit 412 and provides compressed file data unit 412 to encryption stream 404; the read method of encryption stream 404 performs an encryption transformation and provides compressed and encrypted file data unit 414 to tamper detection stream 406; and the read method of tamper detection stream 406 performs a tamper detection transformation to hash the compressed and encrypted file data unit and provides transformed data unit 416 back to the buffer, a receiving process, an output stream or other destination. This process may be engaged, for example, with the destination device communicating with the file server to request (e.g., pull) one unit of data at a time. In some embodiments, hashing each unit of file data may include hashing units of file data as compressed. In some embodiments, hashing each unit of file data may include hashing units of file data as encrypted.

Tamper digest 418 (comprising one or more intermediate or cumulative hash values) may be stored locally or in remote storage. For retrieving the file from a storage volume (local or remote), an inverse transformation pipeline may be established to perform transformations in the opposite direction. For example, a file data unit in a buffer can be read by tamper detection stream 406 that processes the data unit to generate a new tamper detection hash 417, which can evolve as additional units are processed (e.g., generating a cumulative hash). That is, tamper detection hash 417 may include a cumulative hash for a complete file, or an intermediate hash for a portion of the complete file. The hash-evaluated data unit can then, for example, be copied to encryption stream 404 for decrypting (i.e., the inverse operation of encryption transformation stream 404). The hash-evaluated, decrypted file unit can then, for example, be passed to compression stream 402 for decompression (i.e., the inverse operation of compression transformation stream 402). The hash-evaluated, decrypted, and decompressed file data unit can then, for example, be moved back to the buffer, a receiving process, an output stream, or another destination.

As noted above, tamper detection stream 406 may be suitably configured to generate a hash 417 of a portion (i.e., some, but not all) of the file (e.g., an intermediate hash for a portion of the file) or the entire file (e.g., a cumulative hash over all of the file's data units). When servicing a request to write a file to a storage volume, hash 417 can be stored in tamper digest 418 associated with the file, which may be stored with the file or at another location. Tamper digest 418 may include multiple hashes, such as one or more intermediate hashes or a cumulative hash.

When servicing a request to retrieve a file from a storage volume, a new tamper detection hash 417 for the file can be generated and compared to a previously generated and stored hash 421 (e.g., a previously generated intermediate or cumulative hash produced when the file was originally written to the storage volume) to determine if the file has been altered. This comparison can occur when a portion of the file has been processed or after the last data unit has been processed, but preferably before the last unit is sent to a client so that the transfer of the file to the client can be terminated if a discrepancy between the newly generated tamper detection hash 417 and a previously stored tamper detection hash 421 is detected.

In various representative embodiments, transformations may be implemented using a stream class for each transformation that is derived from a standard base stream class. Multiple stream classes can be cascaded (e.g., aggregated together in a particular sequence or constructed from one another) to build a logical stream pipe that allows each read or write method to be called on each stream. In various representative embodiments, buffered content of each read operation may be passed from one (or each) stream class to the next. In various representative aspects, security transformations (e.g., tamper detection, encryption) may be applied in real-time as the file is being read to or written from a memory buffer. In a representative exemplary aspect, such security transformations may be engaged without any of the data in the transformation pipeline (or in the component transformation streams embodied therein) ever being written or otherwise canonically rendered to persistent storage; which is to say that transformations may be applied as data streams through the transformation pipeline.

Accordingly, a significant benefit of various representative exemplary embodiments includes the ability to engage flexible and secure data stream processing with substantially reduced persistent data storage requirements. To the extent that accessing persistent storage is typically the most time-intensive operation performed by modern computing devices, a substantial reduction in the amount of time required to engage, process and manage secure data communication may be realized as well.

In another representative aspect, a compression stream class may be constructed to move data from a buffer and perform compression, an encryption stream class may be constructed using the compression stream class, and a tamper detection stream class may be constructed from the encryption stream class. When a client requests the storing of a file, a read request is processed by each stream class that performs the transformations on the portion of the file passed to the buffer. Accordingly, compression, encryption and tamper detection can occur without the clock cycle and I/O access penalties associated with compressing, encrypting and hashing the entire file.

Because, in some representative embodiments, a standard base stream class may be provided, users can easily extend transformations that can be applied through sub-class inheritance of the properties, variables, functions, methods, etc. of the base stream class.

Embodiments of stream processing may be implemented in a variety of architectures, some non-limiting examples of which are discussed below.

Figure 5:
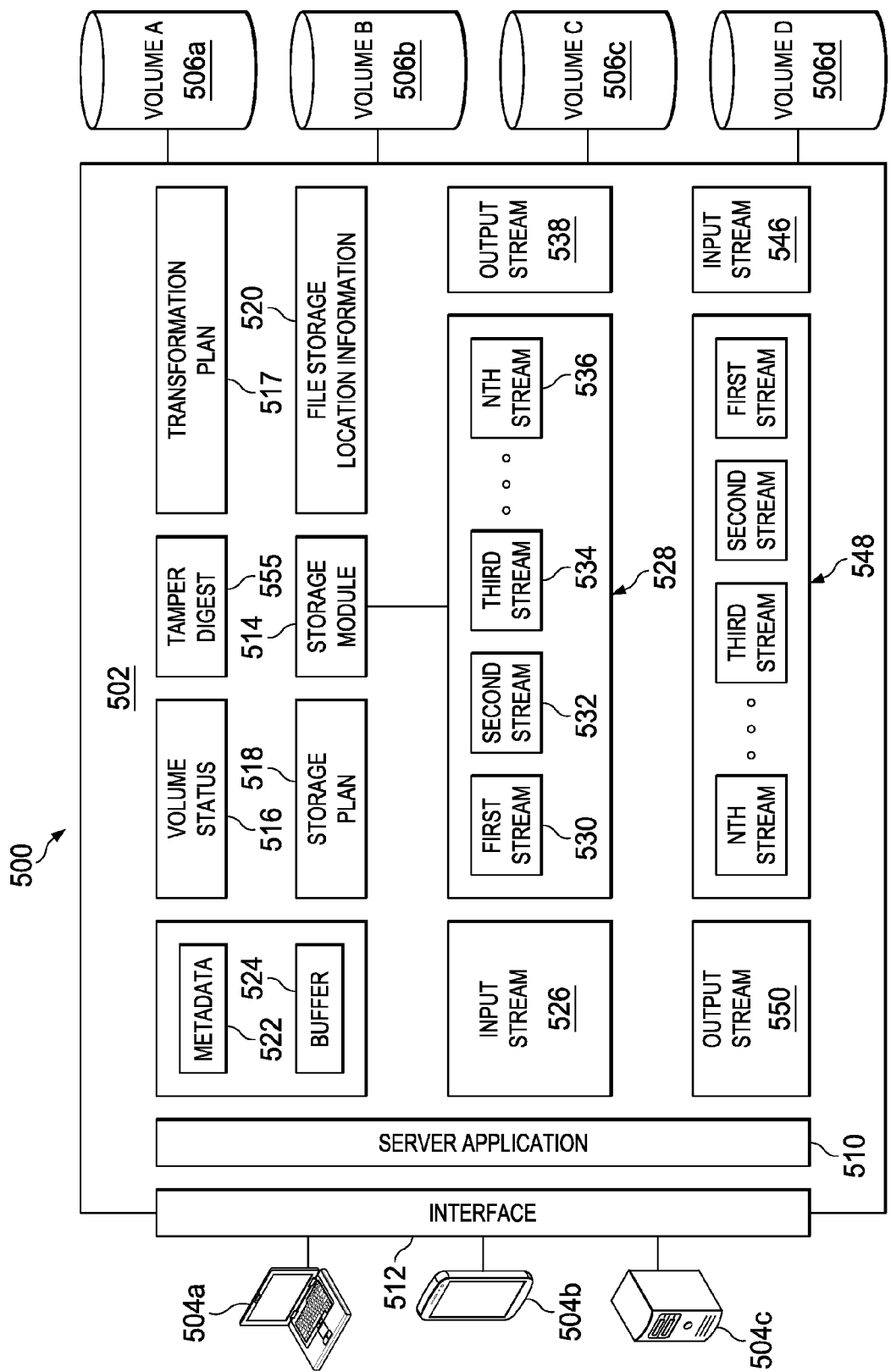
FIG. 5 is a diagrammatic representation of another embodiment of a distributed computer system.

FIG. 5 is a diagrammatic representation of a distributed computer system 500 comprising server 502 (which can be an embodiment of server 102, server 602, or other server) that may be configured to receive and process requests from client computing devices 504 (e.g., laptop computer devices 504a, mobile devices 504b, desktop computer devices 504c, or other computing devices) and access storage volumes 506 (e.g., volumes 506a, 506b, 506c, 506d). According to a representative embodiment, server 502 may be a file server that retrieves or store files for client computing devices 504. A file may be replicated across multiple storage volumes 506.

Storage volumes 506 may comprise a variety of storage types including, but not limited to, local drives, network file server volumes, cloud-based storage volumes, SAN storage, database storage, or other storage. Server 502 may maintain or retrieve information used to connect to and interact with storage volumes 506 to which server 502 has access.

Server 502 may include an application 510 to provide an interface 512, such as a representational state transfer (REST) interface or other interface, through which client computing devices 504 may interact with server 502 to request files and to upload files or create files on server 502. Application 510 may interact with a storage module 514 that provides processes for accessing storage volumes 506.

Storage module 514 can maintain volume status information 516 that provides an indication of the time it takes server 502 to read and write files to various storage volumes 506. Server 502 may be configured to track the costs associated with utilizing various volumes (e.g., access cost, read cost, write cost, or other storage utilization cost metric), and adjust the utilization or duty schedule for the volumes based on the tracked costs as server 502 runs. Volume status information 516 may also include other information, such as whether a storage volume 506 is online, offline, or other status information.

Server 502 may also be suitably adapted to access storage plan 518. Storage plan 518 may be configured to provide rules for storing a file, such as the number of copies that should be stored, storage volumes that can be used, etc. Different storage plans may apply to different documents or types of documents.

Server 502 may also be suitably adapted to access transformation plan 517. Transformation plan 517 may be configured to provide rules for transforming a file. Different transformation plans may apply to different documents or types of documents.

Server 502 may also be suitably adapted to access file storage location information 520. File storage location information 520 may be configured to provide an index or other information associated with where files are stored on storage volumes 506. File storage location information 520 may be used by server 502 to locate, for example, a requested file. An index may, for example, include references identifying storage volumes 506 on which a requested file is stored.

Server 502 may be suitably adapted to receive a request from a client to read or write a file. The request may include metadata 522 or other information that can be used to access metadata 522. Metadata 522 may reference a storage plan 518 and a transformation plan 522. In response to the request, server 502 may be configured to implement processes based on metadata 522 to service the request.

When servicing a request by a client 504 to write/store a file, server 502 may be configured to establish an input stream 526 that places units of file data in memory buffer 524. Alternatively, conjunctively or sequentially, server 502 may use information in metadata 522 to establish a transformation pipeline 528 of n transformation streams (e.g., a first transformation stream 530, a second transformation stream 532, a third transformation stream 534 . . . n'th transformation stream 536) to apply transformations specified in transformation plan 517 to the file and an output stream 538 to stream the file to a destination. Alternatively, conjunctively or sequentially, server 502 may employ a default transformation plan based, at least in part, on information in metadata 522 to establish transformation pipeline 528 comprising n transformation streams. In yet another embodiment, server 502 may alternatively, conjunctively or sequentially employ a default transformation plan without the use of metadata 522 to establish transformation pipeline 528.

It will be appreciated that the recitation of n transformation streams herein (e.g., n'th stream 538) may correspond to any integer number of transformation streams greater than or equal to one; despite the representative depiction of four transformation streams (i.e., 530, 532, 534, 536) in FIG. 5.

When servicing a request by client 504 to read/retrieve a file, server 502 may be configured to establish an input stream 546 that places units of file data in memory buffer 524. Additionally, server 502 may use information in metadata 522 to establish a transformation pipeline 548 of n transformation streams to apply transformations specified in transformation plan 517 to the file and an output stream 550 to stream the file to a destination. Alternatively, conjunctively or sequentially, server 502 may employ a default transformation plan based at least in part on information in transformation plan 517 to establish transformation pipeline 548 comprising n transformation streams. In yet another embodiment, alternatively, conjunctively or sequentially, server 502 may employ a default transformation plan without the use of transformation plan 517 information to establish transformation pipeline 548.

Each unit of data may be passed along transformation pipeline 528, 548 so that the desired transformations may be applied. Pipeline 528 represents a non-limiting example of processing of data when servicing a request from a client 104 to write/store a file, while pipeline 548 represents a non-limiting example of processing data when servicing a request to read/retrieve a file. In various representative embodiments, a pipeline may be bi-directional; meaning, that at least a portion (i.e., some, but not necessarily all) of the component transformation streams in a pipeline may be engaged to perform inverse operations, for example, in reversed order to restore data to a format existing prior to the corresponding component transformation (e.g., decryption restoring encrypted data, decompression restoring compressed data, etc.).

After a unit of data has been transformed in the first transformation stream in the transformation pipeline, it can be passed to the next transformation stream in the transformation pipeline (e.g., transformed data can be passed from first transformation stream 530 to second transformation stream 532) and so on. Accordingly, the transformations may be applied sequentially on a unit-by-unit of file data basis. When the component transformations of the transformation pipeline are completed, the resulting transformed data unit can be passed to output stream 538, 550 (or other process) and sent to a destination. Server 502 can implement the transformation pipeline 528, 548 according to any suitable stream pipelining schema desired.

It will be appreciated that buffer 524 may be smaller than a file, such that while the file may be passed through and transformed at server 502, the entire file is never located at or segmented from server 502 during the process of servicing a request from client 504. Instead, transformations may be applied in real-time or near real-time as the file units are being read or written from buffer 524. Furthermore, it may be the case that the file is not stored in a local file system of server 502 to service a request by a client 504 to read or write a file.

When servicing a request to read/retrieve a file stored on storage volume 506, storage module 514 may be suitably adapted to determine the set of storage volumes 506 on which the file is stored from file location information 520, and the least read cost storage volume on which the file is stored from volume status data 516. Storage module 514 can further determine the transformations to be applied to the file from transformation plan 517. Storage module 514 may be suitably configured to establish: input stream 546 to receive data from the least read cost storage volume; transformation pipeline 548 (having n transformation streams) to apply transformations specified in transformation plan 517 (or default transformations) to the file; and output stream 550 to stream the file to a destination (e.g., server application 510) so that the file can be streamed to requesting device 504.

If a tamper detection transformation is applied when servicing a client request to read/retrieve a file from storage volume 506, the tamper detection transformation stream in transformation pipeline 548 may be suitably configured to generate, for example, a new tamper detection hash (intermediate or cumulative, as previously described) for the file, and storage module 514 can compare the newly generated tamper detection hash to a tamper digest 555 previously stored hash value for the file. Any discrepancy between the newly generated hash and the previously stored hash may indicate that the file has been altered without authorization. In response to detecting a discrepancy, storage module 514 may be configured to engage a tamper detection action, such as not sending the remainder of the file to requesting client 504 (which may result in an error reported to client 504), sending an error notification or message to client 504, reading the file from another storage volume 506, or taking another action.

When servicing a request to write/store a file, storage module 514 may be suitably configured to: identify the least write cost storage volume from storage volumes 506 identified in storage plan 518; determine the transformations to apply from transformation plan 517; establish an input stream 526 to receive data from a source (e.g., client device 504); establish a transformation pipeline 528 of n transformation streams (e.g., first stream 530, second stream 532, third stream 534 . . . n'th stream 536) to apply transformations specified in transformation plan 517 (or default transformations); and establish an output stream 538 to stream the file to a destination (e.g., the least write cost storage volume).

If a tamper detection transformation is applied when servicing a client request to write/store a file to storage volume 506, a tamper detection stream in transformation pipeline 528 may be suitably configured to generate a tamper detection hash for the file. Storage module 514 can store the tamper detection hash in tamper digest 555, which may be stored, for example, at server 502 or at a remote location.

In various representative embodiments, storage module 514 may comprise a storage plan module as discussed, for example, in U.S. patent application Ser. No. 14/656,800, filed 13 Mar. 2015, entitled "System and Method for Data Access and Replication in a Distributed Environment Utilizing Data Derived from Data Access within the Distributed Environment," which is hereby incorporated by reference. Furthermore, various representative embodiments may include replication servers, content agents, centralized repositories (e.g., which may store tamper digests, storage plans, transformation plans, volume status information, or other information), and other features, for example, as discussed in U.S. patent application Ser. No. 14/656,800, filed 13 Mar. 2015.

FIG. 6 is a diagrammatic representation of a distributed computer system 600 comprising a plurality of servers 602 (e.g., server 602a, 602b, etc.), which may be embodiments of server 102, server 502, or other servers. Servers 602 may be suitably configured to receive and process requests from client computing devices 604 (e.g., computing devices 604a, 604b, 604c, 604d, 604e, 604f) corresponding to mobile devices, laptop computers, desktop computers servers, or other computing devices. Servers 602 may be further configured to access a set of storage volumes 606 (e.g., storage volumes 606a, 606b, 606c . . . 606n). It will be appreciated that while FIG. 6 representatively depicts two servers (602a, 602b), any number of server computers may be employed with various other representative embodiments.

Storage volumes 606 may representatively comprise a variety of storage types including, but not limited to, local drives, network file server volumes, cloud-based storage volumes, SAN storage, database storage and other storage. Each server 602 may maintain information used to connect to and interact with storage volumes 606 to which the server has access.

Server 602 may be suitably adapted to maintain volume status information that provides, for example, an indication of the time it takes that server to read or write files to various storage volumes 606. Server 602a may maintain volume status information 612 that includes, for example, the access costs of server 602a to each storage volume 606a-606n (or some subset thereof) and server 602b can maintain volume status information 622 that includes, for example, the access costs of server 602b to each storage volume 606a-606n (or some subset thereof). The volume status information may also include other status information, such as whether a storage volume 606 is online, offline, or other status information.

The volume status information for a server 602 may include volume access costs that provide a measure of the time it takes a server 602 to access a storage volume 606. Each server 602 may be suitably configured to track access (or other) costs, adjusting storage volume 606 utilization as the system runs. Representatively, these costs may not be the same for each server 602 as the systems may be distributed in a wide area network and, in some instances, over a wide geographic area. Access times may vary significantly over such networks because of differences in hardware, software, or network latency.

Servers 602 may also access storage plans (e.g., storage plans 614, 624). The storage plans may be suitably configured to provide rules for storing a data file such as the number of copies that should be stored or the storage volumes that can be used. Different storage plans may apply to different types of documents. For example, a storage plan for financial documents may specify that three copies of the file are to be stored using storage volumes 606a, 606b, 606c or 606n, while a storage plan for medical records may specify that two copies of the file are to be stored using storage volumes 606a and 606b.

Servers 602 may also access file storage location information (e.g., file storage location information 616, 626). File storage location information may provide an index of storage volumes 606 at which files are stored. File storage location information may be used by server 602 to locate a requested file. The file storage location can be propagated between servers 602 so that each server 602 has updated file storage location information.

Servers 602 may further access transformation plans (e.g., transformation plan 617, 627) that specify how a file is to be transformed. Transformation plan 617 may be suitably configured to specify various parameters for performing a transformation, such as, for example, encryption keys to use.

Based on the transformation plan(s) 617, 627 for a data file, server 602 may be suitably adapted to establish a transformation pipeline comprising a sequence of transformation streams to perform one or more transformations. The ability to construct a transformation pipeline on-the-fly for a data file provides the flexibility to apply different sequences of transformations to different files.

When writing a file to storage volume 606, server 602 may be suitably configured to determine the number of copies to be made and, for example, a mirror set of storage volumes to which the file may be replicated. Server 602 may analyze the volume access cost data and select the least cost storage volume 606 of the mirror set as the target storage volume to which an initial copy of the file will be written. According to a representative exemplary embodiment, the process of writing a file can be handled entirely in volatile memory of the server 602 without storing the file in persistent storage of the server 602. The process may also comprise a pipelined process at the server 602. Advantages of handling file writes in volatile memory include reduced overall file storage time (memory access times associated with volatile memory tend to be lower than those associated with hard disk storage), reduced complexity, and reduced hard drive space.

When reading a file from storage volumes 606, server 602 may be suitably configured to determine the mirror set of storage volumes on which the file is stored from the file storage location information, analyze the volume access cost data to determine the least cost member of the mirror set of storage volumes, select the least cost member as the source storage volume and read the file from the source storage volume. According to a representative exemplary embodiment, the process of reading a file can be handled entirely in volatile memory of the server 602 without storing the file in persistent storage of the server 602. The process may also comprise a pipelined process at the server 602.

Server 602 may receive a file from a source (for example, a client device 604 or a storage volume 606) as an input stream, placing units of file data in a memory buffer. Each unit of data can be passed along the transformation pipeline so that the appropriate transformations may be applied. After a unit of data has been transformed in a first transformation stream in the transformation pipeline, it can be passed to the next transformation stream in the transformation pipeline, and so on. Accordingly, the transformations may be applied sequentially on a unit-by-unit basis for the file. When the transformations are completed, a unit can be passed to an output stream or other process and sent to a destination. Server 602 may implement the transformation pipeline according to any desired stream-pipelining scheme.

Representative transformations may include compression transformations, encryption transformations, tamper detection transformations, file format conversions or other transformations.

For example, storage server 602a may be suitably adapted to receive a request to store a file. In representative embodiments, metadata in the request or metadata stored by server 602a or other server, may specify the storage plan 614 and transformation plan 617 to apply to the file. Storage plan 614 can specify, for example, the number of copies of a file to be stored, the storage volumes to use, or other criteria for storing the file. Transformation plan 617 can specify, for example, one or more transformations to be applied to the file. In some cases, certain transformations may be applied by default, such as generating a tamper digest. Consequently, the transformation pipeline may include transformation streams specified in a default transformation plan along with transformations specified in transformation plan 617.

In a representative embodiment, storage plan 614 may be suitably configured to specify that three copies of a file should be made using storage volumes 606a, 606b, 606c or 606n, and transformation plan 617 can specify that the file should be compressed and encrypted. In some cases, a default transformation (e.g., tamper detection or other transformation) can be added to a transformation pipeline. In a representative example, storage server 602a can access volume status information 612 and determine, for example, that the least cost storage volume for server 602a is storage volume 606a. Storage server 602a can then write the first copy of the file 632 to storage volume 606a, with the appropriate transformations applied according to transformation plan 617. Thereafter, file storage location information 616 and tamper digest information may be updated.

In a representative embodiment, the two remaining copies of file 634, 636 can be made at a later time. According to one embodiment, a background process on server 602a (or another server) can copy the first copy of the file 632 from storage volume 606a to storage volume 606b and storage volume 606c making the appropriate transformations. The process of copying the file may include, for example, reading the file from the least cost storage volume 606 on which a copy of the file is stored and writing the file to the least cost storage volume in the mirror set on which a copy of the file is not yet stored.

In a representative embodiment where storage server 602b receives a request to read the file, server 602b may be suitably configured to determine that the copies of the file are stored at storage volumes 606a, 606b and 606c from file storage location information 626. Server 602b may be suitably configured to determine the least cost storage volume from which to read the file using volume status information 622, read the file from the least cost volume, and apply the appropriate transformations.

In another representative embodiment, each server 602 may be suitable configured to track the time it takes the server to perform an operation using four separate cost values for each volume: fixed read, variable read, fixed write, and variable write, as discussed, for example, in U.S. patent application Ser. No. 14/656,800, filed 13 Mar. 2015.

Routines, methods, steps, operations or portions thereof described herein may be implemented through control logic, including computer executable instructions stored on a computer-readable medium, hardware, firmware or a combination thereof. The control logic can be adapted to direct an information-processing device to perform a set of steps disclosed in the various embodiments. Some embodiments may be implemented by using software programming or code in one or more digital computers, by using application specific integrated circuits (ASICs), programmable logic devices, field programmable gate arrays (FPGAs), optical, chemical, biological, quantum or nanoengineered systems, components and mechanisms. Based on the disclosure and teachings provided herein, a person skilled in the art will appreciate other ways or methods to implement the invention.

Computer executable instructions or code can be stored in a computer-readable medium and can be operated on by a processor to permit a computer to perform functions, steps, operations, methods, routines, operations or portions thereof described herein. Any suitable programming language may be used, including: C, C++, Java, JavaScript, assembly language, or other programming or scripting code. Different programming techniques can be employed, such as procedural or object oriented programming. In an embodiment, HTML may utilize client-side or server-side scripting to provide a means of automation and calculation through coding.

Any particular step, operation, method, routine, operation or portion thereof can execute on a single computer processing device or multiple computer processing devices, a single computer processor or multiple computer processors. Data may be stored in a single storage medium or distributed through multiple storage mediums, and may reside in a single database or multiple databases (or other data storage). The sequence of operations described herein can be interrupted, suspended, or otherwise controlled by another process, such as an operating system, kernel, etc. The routines can operate in an operating system environment or as stand-alone routines.

A "computer-readable medium" may be any type of data storage medium that can store computer instructions, including, but not limited to read-only memory (ROM), random access memory (RAM), hard disks (HD), data cartridges, data backup magnetic tapes, floppy diskettes, flash memory, optical data storage, CD-ROMs, or the like. The computer-readable medium can be, by way of example, but not by limitation, an electronic, magnetic, optical, electromagnetic, infrared, or semiconductor system, apparatus, system, device, or computer memory. The computer-readable medium may include multiple computer-readable media storing computer executable instructions, such as in a distributed system or instructions stored across an array.

A "processor" includes any hardware system, hardware mechanism or hardware component that processes data, signals or other information. A processor can include a system with a central processing unit, multiple processing units, dedicated circuitry for achieving functionality, or other systems. Processing need not be limited to a geographic location, or have temporal limitations; for example, a processor can perform its functions in "real-time," "offline," in a "batch mode," etc. Portions of processing can be performed at different times and at different locations, by different (or the same) processing systems.

It will be understood for purposes of this disclosure that a service or module is one or more computer devices, configured (e.g., by a computer process or hardware) to perform one or more functions. A service may present one or more interfaces which can be utilized to access these functions. Such interfaces include APIs, interfaces presented for a web services, web pages, remote procedure calls, remote method invocation, etc.

Embodiments may be implemented in a computer communicatively coupled to a network (for example, the Internet, an intranet, an internet, a wide area network ("WAN"), a local area network ("LAN"), a storage area network ("SAN"), a personal area network ("PAN"), etc.), another computer, or in a standalone computer. As is known to those skilled in the art, the computer can include a central processing unit ("CPU") or processor, memory (e.g., primary or secondary memory such as RAM, ROM, HD or other computer-readable medium for the persistent or temporary storage of instructions and data) and one or more input/output ("I/O") device(s). The I/O devices can include a keyboard, monitor, printer, electronic pointing device (for example, mouse, trackball, stylus, etc.), touch screen, or the like. In representative embodiments, the computer has access to at least one database on the same hardware or over the network.

Steps, operations, methods, routines or portions thereof of the invention may be implemented on one computer or shared among two or more computers. In one embodiment, the functions of the invention may be distributed in the network. Communications between computers implementing representative embodiments can be accomplished using any electronic, optical, radio frequency signals, or other suitable methods and tools of communication in compliance with network or other communications protocols.

As used herein, the terms "comprises," "comprising," "includes," "including," "has," "having" or any contextual variant thereof, are intended to cover a non-exclusive inclusion. For example, a process, product, article, or apparatus that comprises a list of elements is not necessarily limited to only those elements but may include other elements not expressly listed or inherent to such process, product, article, or apparatus.

Further, unless expressly stated to the contrary, "or" refers to an inclusive or and not to an exclusive or. That is, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present).

As used herein, a term preceded by "a" or "an" (and "the" when antecedent basis is "a" or "an") includes both singular and plural of such term unless the context clearly dictates otherwise. Also, as used in the description herein, the meaning of "in" includes "in" and "on" unless the context clearly dictates otherwise.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification, and all such embodiments are intended to be included within the scope of that term or terms. Language designating such non-limiting examples and illustrations includes, but is not limited to: "for example," "for instance," "e.g.," "in a representative embodiment," "in one embodiment."

Reference throughout this specification to "one embodiment," "an embodiment," "a representative embodiment," or "a specific embodiment" or similar terminology means that a particular feature, structure, or characteristic described in connection with the embodiment is included in at least one embodiment and may not necessarily be present in all embodiments. Thus, respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature, or function is not intended to limit the scope of the invention to such embodiment, feature, or function). Rather, the description is intended to describe illustrative embodiments, features and functions in order to provide a person of ordinary skill in the art context to understand the invention without limiting the invention to any particularly described embodiment, feature, or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes, and substitutions are intended in the foregoing disclosures, and it will be appreciated that in some instances, some features of embodiments of the invention will be employed without a corresponding use of other features without departing from the scope and spirit of the invention as set forth. Therefore, many modifications may be made to adapt a particular situation or material to the essential scope and spirit of the invention.

In the description herein, numerous specific details are provided, such as examples of components or methods, to provide a thorough understanding of representative embodiments of the invention. One skilled in the relevant art will recognize, however, that an embodiment may be able to be practiced without one or more of the specific details, or with other apparatus, systems, assemblies, methods, components, materials, parts, or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment, and a person of ordinary skill in the art will recognize that additional embodiments are readily understandable and are a part of this invention.

Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted. The scope of the disclosure should be determined by the following claims and their legal equivalents.

What is claimed is:

1. A system for streamed transformation of data, the system comprising:
   a storage device;
   a first computing device coupled to the storage device, the first computing device comprising a memory, a processor, at least one non-transitory computer-readable medium, and stored instructions translatable by the processor to perform:
      receiving a request from a second computing device to read or write a file;
      responsive to the request, creating a transformation pipeline, the transformation pipeline providing a processing sequence and traffic path for streamed data and comprising a sequence of transformation streams corresponding to a set of transformations to be applied to the file, the creating the transformation pipeline comprising instantiating a stream object for each transformation stream of the transformation streams, the stream object including a write method for moving a unit of data into the each transformation stream and a read method for retrieving the unit of data from the each transformation stream, calling a transformation function of the set of transformations to transform the unit of data, and providing the unit of data thus transformed within the each transformation stream to a next transformation stream or, if there are no more transformation streams in the transformation pipeline, to a destination device;
      receiving file data for the file streamed from a source device;
      buffering the file data from the source device in a memory buffer at the first computing device;
      segmenting buffered file data to produce units of file data;
      passing and transforming the file data through the transformation pipeline one unit of file data at a time, wherein transforming a unit of file data comprises:
         providing the unit of file data to a first transformation stream in the transformation pipeline, the providing performed by a write method associated with the first transformation stream;
         applying a transformation associated with the first transformation stream to the unit of file data, the applying performed by a read method associated with the first transformation stream, the applying including the read method calling a transformation function to perform the transformation; and
         performing the providing and the applying until all transformations in the set of transformations have been applied to the unit of file data through the sequence of transformation streams in the transformation pipeline; and
      sending the unit of file data so transformed by the set of transformations to a destination device.

2. The system of claim 1, wherein the transformation pipeline is created based on at least one of:
   metadata contained in the request;
   file metadata associated with the file; or
   a transformation plan specifying the set of transformations to apply to the file.

3. The system of claim 1, wherein creating the transformation pipeline comprises aggregating or bundling a plurality of stream classes in sequence such that a result from a first transformation stream is passed as input to a second transformation stream in the transformation pipeline.

4. The system of claim 1, wherein the unit of file data so transformed at the first computing device is not persisted at the first computing device.

5. The system of claim 1, wherein the file data is passed and transformed through the transformation pipeline one unit of file data at a time until at least one of:
reading of the file by the destination device is complete;
writing of the file to the destination device is complete; or
a termination condition is satisfied.

6. The system of claim 5, wherein the termination condition is associated with a determination by the first computing device of a difference between a newly generated hash associated with the file and a previously stored hash associated with the file.

7. The system of claim 1, wherein the set of transformations comprises at least one of:
an encryption transformation and the transformation pipeline which comprises an encryption transformation stream;
a compression transformation and the transformation pipeline which comprises a compression transformation stream; or
a tamper detection transformation and the transformation pipeline which comprises a tamper detection transformation stream.

8. A method for streamed transformation of data, the method comprising:
a first computing device receiving a request from a second computing device to read or write a file, the first computing device comprising a memory, a processor, at least one non-transitory computer-readable medium, and stored instructions translatable by the processor;
responsive to the request, the first computing device creating a transformation pipeline, the transformation pipeline providing a processing sequence and traffic path for streamed data and comprising a sequence of transformation streams corresponding to a set of transformations to be applied to the file, the creating the transformation pipeline comprising instantiating a stream object for each transformation stream of the transformation streams, the stream object including a write method for moving a unit of data into the each transformation stream and a read method for retrieving the unit of data from the each transformation stream, calling a transformation function of the set of transformations to transform the unit of data, and providing the unit of data thus transformed within the each transformation stream to a next transformation stream or, if there are no more transformation streams in the transformation pipeline, to a destination device;
the first computing device receiving file data for the file streamed from a source device;
buffering the file data from the source device in a memory buffer at the first computing device;
the first computing device segmenting buffered file data to produce units of file data;
the first computing device passing and transforming the file data through the transformation pipeline one unit of file data at a time, wherein transforming a unit of file data comprises:
providing the unit of file data to a first transformation stream in the transformation pipeline, the providing performed by a write method associated with the first transformation stream;
applying a transformation associated with the first transformation stream to the unit of file data, the applying performed by a read method associated with the first transformation stream, the applying including the read method calling a transformation function to perform the transformation; and
performing the providing and the applying until all transformations in the set of transformations have been applied to the unit of file data through the sequence of transformation streams in the transformation pipeline; and
the first computing device sending the unit of file data so transformed by the set of transformations to a destination device.

9. The method according to claim 8, wherein the transformation pipeline is created based on at least one of:
metadata contained in the request;
file metadata associated with the file; or
a transformation plan specifying the set of transformations to apply to the file.

10. The method according to claim 8, wherein creating the transformation pipeline comprises aggregating or bundling a plurality of stream classes in sequence such that a result from a first transformation stream is passed as input to a second transformation stream in the transformation pipeline.

11. The method according to claim 8, further comprising:
repeating the passing and transforming the file data through the transformation pipeline until at least one of:
reading of the file by the destination device is complete;
writing of the file to the destination device is complete; or
a termination condition is satisfied.

12. The method according to claim 11, wherein the termination condition is associated with a determination by the first computing device of a difference between a newly generated hash associated with the file and a previously stored hash associated with the file.

13. A computer program product comprising at least one non-transitory computer-readable medium storing instructions translatable by a processor of a first computing device to perform:
receiving a request from a second computing device to read or write a file;
responsive to the request, creating a transformation pipeline, the transformation pipeline providing a processing sequence and traffic path for streamed data and comprising a sequence of transformation streams corresponding to a set of transformations to be applied to the file, the creating the transformation pipeline comprising instantiating a stream object for each transformation stream of the transformation streams, the stream object including a write method for moving a unit of data into the each transformation stream and a read method for retrieving the unit of data from the each transformation stream, calling a transformation function of the set of transformations to transform the unit of data, and providing the unit of data thus transformed within the each transformation stream to a next transformation stream or, if there are no more transformation streams in the transformation pipeline, to a destination device;
receiving file data for the file streamed from a source device;
buffering the file data from the source device in a memory buffer at the first computing device;
segmenting buffered file data to produce units of file data;
passing and transforming the file data through the transformation pipeline one unit of file data at a time, wherein transforming a unit of file data comprises:
providing the unit of file data to a first transformation stream in the transformation pipeline, the providing performed by a write method associated with the first transformation stream;
applying a transformation associated with the first transformation stream to the unit of file data, the applying performed by a read method associated with the first transformation stream, the applying including the read method calling a transformation function to perform the transformation; and performing the providing and the applying until all transformations in the set of transformations have been applied to the unit of file data through the sequence of transformation streams in the transformation pipeline; and sending the unit of file data so transformed by the set of transformations to a destination device.

14. The computer program product of claim 13, wherein the transformation pipeline is created based on at least one of:

metadata contained in the request;

file metadata associated with the file; or a transformation plan specifying the set of transformations to apply to the file.

15. The computer program product of claim 13, wherein creating the transformation pipeline comprises aggregating or bundling a plurality of stream classes in sequence such that a result from a first transformation stream is passed as input to a second transformation stream in the transformation pipeline.

16. The computer program product of claim 13, wherein the file data is passed and transformed through the transformation pipeline one unit of file data at a time until at least one of:

reading of the file by the destination device is complete;

writing of the file to the destination device is complete; or a termination condition is satisfied.

17. The computer program product of claim 16, wherein the termination condition is associated with a determination by the first computing device of a difference between a newly generated hash associated with the file and a previously stored hash associated with the file.

* * * * *